(12) United States Patent
Danilov et al.

(10) Patent No.: US 11,119,683 B2
(45) Date of Patent: Sep. 14, 2021

(54) LOGICAL COMPACTION OF A DEGRADED CHUNK IN A GEOGRAPHICALLY DIVERSE DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 16/228,624

(22) Filed: Dec. 20, 2018

(65) Prior Publication Data
US 2020/0201555 A1 Jun. 25, 2020

(51) Int. Cl.
*G06F 3/06* (2006.01)
*G06F 12/10* (2016.01)

(52) U.S. Cl.
CPC ............ *G06F 3/0647* (2013.01); *G06F 3/067* (2013.01); *G06F 3/0608* (2013.01); *G06F 12/10* (2013.01); *G06F 2212/1044* (2013.01); *G06F 2212/154* (2013.01)

(58) Field of Classification Search
CPC ...... G06F 12/00; G06F 3/0647; G06F 3/0608; G06F 2212/1044; G06F 2212/154
USPC ........................................................ 711/165
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,502,243 B1 | 12/2002 | Thomas | |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,664,839 B1 | 2/2010 | Karr et al. | |
| 7,680,875 B1 | 3/2010 | Shopiro et al. | |
| 7,721,044 B1 | 5/2010 | Chatterjee et al. | |
| 8,125,406 B1 | 2/2012 | Jensen et al. | |
| 8,261,033 B1 | 9/2012 | Slik et al. | |

(Continued)

OTHER PUBLICATIONS

Office Action dated Nov. 16, 2018 for U.S. Appl. No. 15/662,273, 19 pages.

(Continued)

*Primary Examiner* — Gautam Sain
(74) *Attorney, Agent, or Firm* — Amin, Turocy & Watson, LLP

(57) ABSTRACT

Generating, in a geographically diverse storage system, a degraded convolved chunk that consumes less storage space than a convolved chunk that is not a degraded chunk is disclosed. The degraded convolved chunk can be generated at a third zone of the storage system and be based on a compressed representation of a first chunk from a first zone of the storage system and a second chunk from a second zone of the storage system, wherein the first chunk is a degraded chunk that comprises at least one non-relevant chunk fragment. In an embodiment, the compressed representation can be generated at the first zone. In another embodiment the compressed representation can be generated at the third zone. In an aspect, mapping data corresponding a logical compression of first chunk fragments to physical storage locations of the first chunk fragments can be employed in data operations of the storage system.

20 Claims, 10 Drawing Sheets

(56) References Cited

U.S. PATENT DOCUMENTS

| | | |
|---|---|---|
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,540,625 B2 | 9/2013 | Miyoshi |
| 8,683,205 B2 | 3/2014 | Resch et al. |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1* | 10/2016 | Bent ............ G06F 16/2365 |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,644,408 B2 | 5/2020 | Sakai et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,797,863 B2 | 10/2020 | Chen et al. |
| 10,846,003 B2 | 11/2020 | Danilov et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1* | 10/2007 | Fineberg ............ G06F 11/1451 711/162 |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1* | 8/2011 | Drobychev ............ G06F 16/248 707/634 |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |

(56) References Cited

U.S. PATENT DOCUMENTS

| | | | |
|---|---|---|---|
| 2016/0232055 | A1 | 8/2016 | Vairavanathan et al. |
| 2016/0253400 | A1 | 9/2016 | McAlister et al. |
| 2016/0277497 | A1 | 9/2016 | Bannister et al. |
| 2016/0292429 | A1* | 10/2016 | Manville ............ G06F 16/1748 |
| 2016/0294419 | A1 | 10/2016 | Sandell et al. |
| 2016/0328295 | A1 | 11/2016 | Baptist et al. |
| 2016/0357443 | A1 | 12/2016 | Li et al. |
| 2016/0357649 | A1 | 12/2016 | Karrotu et al. |
| 2016/0371145 | A1 | 12/2016 | Akutsu et al. |
| 2016/0378624 | A1 | 12/2016 | Jenkins, Jr. et al. |
| 2016/0380650 | A1 | 12/2016 | Calder et al. |
| 2017/0003880 | A1 | 1/2017 | Fisher et al. |
| 2017/0004044 | A1 | 1/2017 | Tormasov et al. |
| 2017/0017671 | A1 | 1/2017 | Baptist et al. |
| 2017/0031945 | A1 | 2/2017 | Sarab et al. |
| 2017/0097875 | A1* | 4/2017 | Jess ..................... G06F 11/1092 |
| 2017/0102993 | A1 | 4/2017 | Hu et al. |
| 2017/0116088 | A1 | 4/2017 | Anami et al. |
| 2017/0187398 | A1 | 6/2017 | Trusov |
| 2017/0187766 | A1 | 6/2017 | Zheng et al. |
| 2017/0206025 | A1 | 7/2017 | Viswanathan |
| 2017/0206135 | A1 | 7/2017 | Zeng |
| 2017/0212680 | A1 | 7/2017 | Waghulde |
| 2017/0212845 | A1 | 7/2017 | Conway |
| 2017/0235507 | A1 | 8/2017 | Sinha et al. |
| 2017/0262187 | A1 | 9/2017 | Manzanares et al. |
| 2017/0268900 | A1 | 9/2017 | Nicolaas et al. |
| 2017/0285952 | A1 | 10/2017 | Danilov et al. |
| 2017/0286009 | A1 | 10/2017 | Danilov et al. |
| 2017/0286436 | A1 | 10/2017 | Neporada et al. |
| 2017/0286516 | A1 | 10/2017 | Horowitz et al. |
| 2017/0288701 | A1 | 10/2017 | Slik et al. |
| 2017/0344285 | A1 | 11/2017 | Choi et al. |
| 2018/0052744 | A1 | 2/2018 | Chen et al. |
| 2018/0063213 | A1 | 3/2018 | Bevilacqua-Linn et al. |
| 2018/0074881 | A1 | 3/2018 | Burden |
| 2018/0121286 | A1 | 5/2018 | Sipos |
| 2018/0129417 | A1 | 5/2018 | Sivasubramanian et al. |
| 2018/0181324 | A1 | 6/2018 | Danilov et al. |
| 2018/0181475 | A1 | 6/2018 | Danilov et al. |
| 2018/0181612 | A1 | 6/2018 | Danilov et al. |
| 2018/0246668 | A1 | 8/2018 | Sakashita et al. |
| 2018/0267856 | A1 | 9/2018 | Hayasaka et al. |
| 2018/0267985 | A1 | 9/2018 | Badey et al. |
| 2018/0306600 | A1 | 10/2018 | Nicolaas et al. |
| 2018/0307560 | A1 | 10/2018 | Vishnumolakala et al. |
| 2018/0341662 | A1 | 11/2018 | He |
| 2018/0375936 | A1 | 12/2018 | Chirammal et al. |
| 2019/0028179 | A1 | 1/2019 | Kalhan |
| 2019/0034084 | A1 | 1/2019 | Nagarajan et al. |
| 2019/0043201 | A1 | 2/2019 | Strong et al. |
| 2019/0043351 | A1 | 2/2019 | Yang et al. |
| 2019/0050301 | A1 | 2/2019 | Juniwal et al. |
| 2019/0065092 | A1 | 2/2019 | Shah et al. |
| 2019/0065310 | A1 | 2/2019 | Rozas |
| 2019/0114223 | A1 | 4/2019 | Pydipaty et al. |
| 2019/0205437 | A1 | 7/2019 | Larson et al. |
| 2019/0215017 | A1 | 7/2019 | Danilov et al. |
| 2019/0220207 | A1 | 7/2019 | Lingarajappa |
| 2019/0356416 | A1 | 11/2019 | Yanovsky et al. |
| 2019/0384500 | A1 | 12/2019 | Danilov et al. |
| 2019/0386683 | A1 | 12/2019 | Danilov et al. |
| 2020/0026810 | A1 | 1/2020 | Subramaniam et al. |
| 2020/0042178 | A1 | 2/2020 | Danilov et al. |
| 2020/0050510 | A1 | 2/2020 | Chien et al. |
| 2020/0104377 | A1 | 4/2020 | Earnesty, Jr. et al. |
| 2020/0117556 | A1 | 4/2020 | Zou et al. |

OTHER PUBLICATIONS

Wikipedia, "Standard Raid Levels—RAID 6", URL: https://en.wikipedia.org/wiki/Standard_RAID_levels#RAID_6, Oct. 18, 2019, 11 pages.

Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Office Action dated Jan. 9, 2020 for U.S. Appl. No. 16/010,255, 31 pages.
Office Action dated Feb. 5, 2020 for U.S. Appl. No. 16/261,551, 30 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Non-Final Office Action received for U.S. Appl. No. 15/651,504 dated Mar. 21, 2019, 10 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance dated May 4, 2020 for U.S. Appl. No. 16/240,193, 46 pages.
Office Action dated May 11, 2020 for U.S. Appl. No. 16/177,278, 53 pages.
Office Action dated May 8, 2020 for U.S. Appl. No. 16/231,018, 78 pages.
Notice of Allowance dated May 11, 2020 for U.S. Appl. No. 16/240,193, 24 pages.
Office Action received for U.S. Appl. No. 16/254,073, dated Aug. 18, 2020, 62 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.

(56) References Cited

OTHER PUBLICATIONS

Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.

* cited by examiner

LOGICAL COMPACTION OF A DEGRADED CHUNK IN A GEOGRAPHICALLY DIVERSE DATA STORAGE SYSTEM

TECHNICAL FIELD

The disclosed subject matter relates to data convolution, more particularly, to logically compacting a partially filled data block, e.g., a degraded chunk, employed in convolution with another data block among geographically diverse storage devices.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Moreover, a first data block from a first data store at a first location can be convolved with a second data block and stored at a second location that is at a geographically different location than the first location.

DETAILED DESCRIPTION

Figure 1:
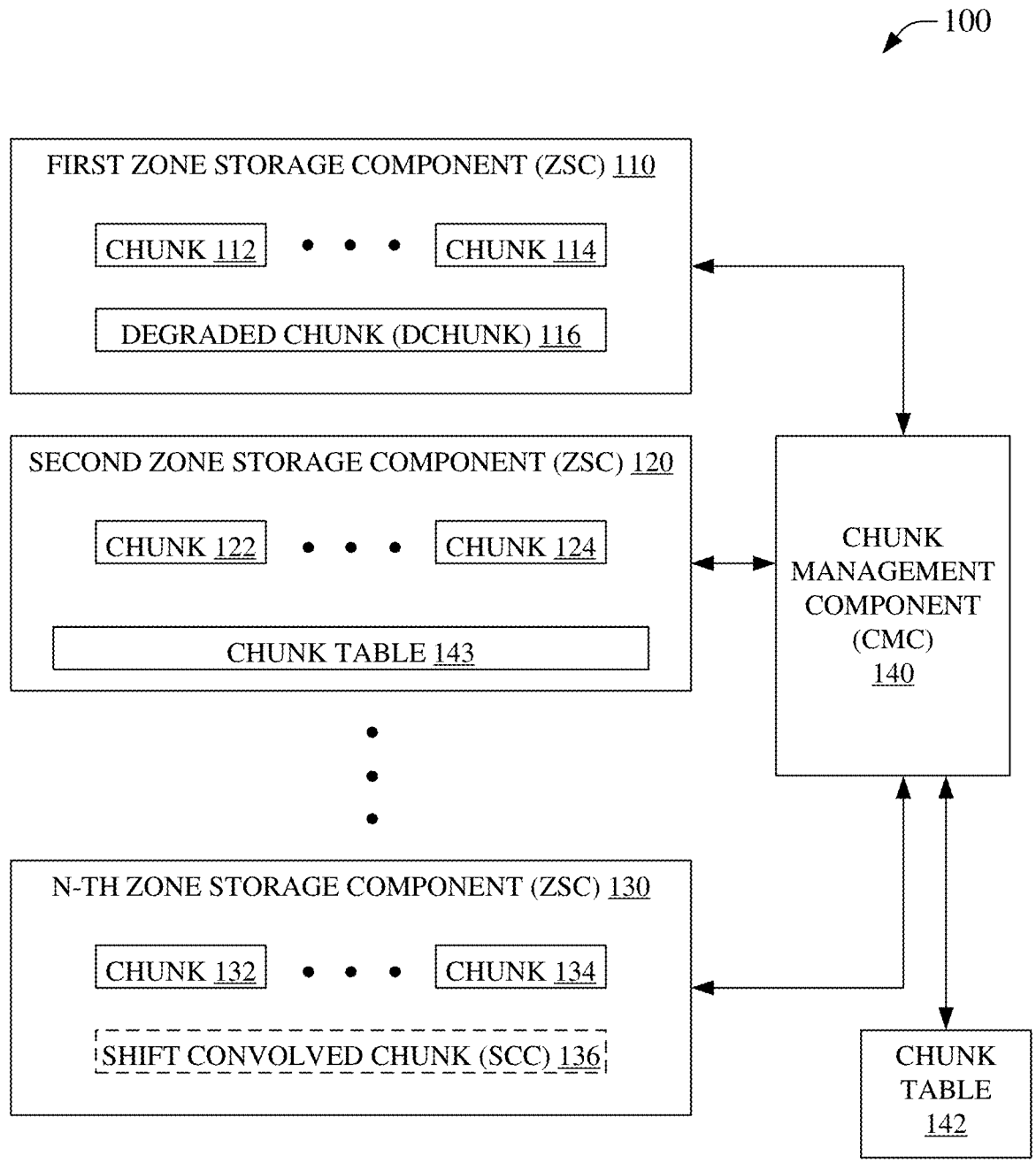
FIG. 1 is an illustration of an example system that can facilitate reducing storage resource consumption when generating a convolved chunk comprising a representation of a degraded chunk in a geographically diverse storage construct, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Data storage techniques that can employ convolution and deconvolution can enable conserving of storage space, e.g., reducing storage resource consumption. As an example, convolution can allow data to be packed or hashed in a manner that can use less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example ECS (formerly known as Elastic Cloud Storage) offered by Dell EMC. Bulk storage can, in an aspect, manage disk capacity via partitioning of disk space into blocks of fixed size, frequently referred to as chunks, for example a 128 MB chunk, etc. A chunk can be comprised of user data fragments. Chunks can also, in some embodiments, employ data protection mechanisms, such as using redundant coding fragments, for example, a 12+4 fragment protection scheme can have 12 fragments and four redundant fragments that can allow for recovery of any of the 12 fragments. Accordingly, under the example 12+4 protection scheme, an example 128 MB chunk can have 12 data fragments and four redundant fragments that can each be about 8 MB in size, as will be used to illustrate the disclosed subject matter herein. It is noted that other chunk sizes, protection schema, and fragment sizes are readily employed and are germane to the instant disclosure and that all such permutations are within the scope of the current disclosure even where not explicitly recited for the sake of clarity and brevity.

Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convolved chunk stored at a geographically diverse storage device can comprise data from some or all storage devices of a geographically diverse storage system. As an example, where there are five storage devices, a first storage device can convolve chunks from the other four storage devices to create a 'backup' of the data from the other four storage devices. In this example, the first storage device can create a backup chunk from chunks received from the other four storage devices. In an aspect, this can result in generating copies of the four received chunks at the first storage device and then convolving the four chunks to generate a fifth chunk that is a backup of the other four chunks. Moreover, one or more other copies of the four chunks can be created at the first storage device for redundancy. In another example, the first storage device can convolve chunks from three of the other four storage devices.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk.

In an aspect, a full chunk can be regarded as having 'k' data fragments comprised therein. Accordingly, a degraded chunk can be a partially full chunk, a damaged full chunk, a full chunk comprising stale data, etc., e.g., a degraded chunk can comprise fewer than k relevant data fragments. As an example, a chunk can be sealed before it becomes full. In this example, a storage system can store T data fragments in the chunk having space for 'k' data fragments prior to the chunk being sealed. The remaining 'k–j' data fragments can contain no relevant user data, e.g., non-relevant values, non-relevant user data, etc. In an embodiment, the remaining k–j fragment space of a degraded chunk can comprise formatted or unformatted empty space, e.g., the remaining space can be, for example, formatted to all zeros, formatted to all ones, can be unformatted to comprise a mix of ones and zeros, can be a mix of formatted and unformatted space, etc. A degraded chunk can be, for example, a result of some ZSC/node failure, a ZSC/node restart, etc. As an example, where a storage system survives a period of instability, the system can produce thousands of poorly filled chunks, such as chunks with just one or two data fragments (j=1 or j=2), etc.

In an aspect, management of chunks can result in chunks that are deemed to comprise less than k relevant data fragments. As an example DELL/EMC's ECS system can implement a quasi-compacting garbage collection that can result in degraded chunks. In the example, a quasi-compacting garbage collection process can locate unused or no longer relevant space within chunks, e.g., k–j space, and can reclaim the corresponding capacity for reuse, e.g., using the reclaimed space to create new chunks, etc. With the example quasi-compacting garbage collection process, chunks can gradually degrade and more non-relevant fragments comprise the chunk, e.g., a chunk can "lose" data fragments at its beginning, its end, or in the middle. The number of "lost" fragments can grow as time elapses.

In another aspect, as data in chunks becomes stale, old, redundant, etc., which can be related to degradation of chunks into degraded chunks, it can be desirable to delete these chunks to free storage space for other uses. It will be noted that a degraded chunk does not have to be deleted, but that in some instances it can be desirable to delete a degraded chunk, for example, where all representations of relevant data fragments of a degraded chunk can be replicated in a less degraded chunk, it can be desirable to thereafter delete the degraded chunk to consume less data storage space.

In an aspect, a convolved chunk can be de-convolved, partially or completely, to yield other chunks, e.g., the other chunks can represent the same data as the convolved chunk but can typically consume more storage space because these other chunks are less highly convolved. As an example, the chunk (AB(CD)), which can be chunk A convolved with Chunk B convolved with a chunks that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a degraded chunk is stored in a geographically diverse storage system, the convolution/deconvolution relative to the degraded chunk can comprise transfer of chunk data, e.g., via a network, etc., to facilitate the convolution/deconvolution. As an example, where the chunk (ABC) is at a first zone, and chunk D is a degraded chunk at a second zone that is to be convolved with (ABC) at a third zone, data for chunk (ABC) can be communicated via a network, etc., from the first zone to the third zone, and less than all of chunk D, written as chunk D! (which can be pronounced 'dee-bang') can be communicated via the network from the second zone to the third zone to allow for convolution, e.g., (ABC) XOR (D!), resulting in chunk (ABCD) at the third zone because the data represented in D! fully represents the relevant data of degraded chunk D. In this example, communicating less than chunk D, e.g., communicating just chunk D!, can consume less network resources than communicating all of chunk D via the network, e.g., communicating irrelevant portions of chunk D can be considered wasteful consumption of the network resources. Correspondingly, where D is to be deleted from (ABCD), then chunk D!, e.g., less than all of chunk D, can be communicated to facilitate the deletion of chunk D data representations form (ABCD) and resulting in chunk (ABC) with less consumption of network resources than would have occurred if all of chunk D, e.g., including relent data, were communicated to enable the deletion event. It will be noted that in addition to reducing network resource consumption, fewer processor resources, volatile memory resources, energy consumption, etc., can also result from not communicating an irrelevant portion of a degraded chunk in relation to geographically diverse data storage system events. As such, it can be desirable to reduce resource consumption in communicating chunks between zones to where degraded chunk are involved.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '$\oplus$', etc., where the data in the Seattle and Dallas local chunks can be convolved by XOR processes to form the Boston chunk, e.g., $C=A1 \oplus B1$, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of example system 100, which can facilitate reducing storage resource consumption when generating a convolved chunk comprising a representation of a degraded chunk in a geographically diverse storage construct, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100. A zone can correspond to a geographic location or region. As such, different zones can be associated with different geographic locations or regions. A ZSC can comprise one or more data stores in one or more locations. In an aspect, a ZSC can store at least part of a data chunk on at least part of a data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc.

In an aspect, data chunks can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing data redundancy that can protect the data of the first chunk, for example, where a storage device storing the first chunk or a replicate thereof becomes compromised, the other replicates (or the first chunk itself) can remain uncompromised. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available. In an aspect, replication of chunks can enable deconvolution of convolved chunks at another zone(s). Deconvolution of a convolved chunk, for example, can facilitate creation of a convolved chunk, deletion of data from a convolved chunk, recovery of a lost/inaccessible chunk, etc. Accordingly, it can be desirable to reduce resource consumption, e.g., reduce data communicated to replicate relevant portions of chunks between zones or between devices of a zone, so that less bandwidth, less storage, etc., is consumed during geographically diverse storage system events.

A geographically diverse storage system, e.g., a system comprising system 100, can replicate chunks from a first ZSC at another ZSC as part of generating a convolved chunk, e.g., generating shift convolved chunk (SCC) 136 at N-th ZSC 130 based on representations of chunks form first ZSC 110 and/or second ZSC 120, etc., e.g., chunks 112-114, degraded chunk (dchunk) 116, chunks 122-124, chunks 132-134, etc.

In an embodiment, chunks can be managed by chunk management component (CMC) 140. CMC 140 can facilitate convolving chunks from one or more ZSCs at another ZSC. As an example, CMC 140 can facilitate convolving dchunk 116 with chunk 124 to form SCC 136 at ZSC 130. Data can be stored on a storage device of a corresponding ZSC, and can be affiliated with an index, location, address, etc., of the data on the storage device of the ZSC. As an example, chunk 124 can be associated with a physical memory element(s) of a hard drive of ZSC 120 that can store the data of chunk 124. In this example, the chunk can be affiliated with a starting address, an ending address, an intermediate address, etc. In an aspect, an intermediate address can correspond to fragments of the chunk, such as where, for example, chunk 124 comprises twelve chunk fragments, chunk 124 can be affiliated with a starting address, eleven intermediate addresses corresponding to the start of the second through twelfth fragment of the chunk, an ending address, etc. Accordingly, operations can be performed relative to the addresses of the fragments of example chunk 124, e.g., the fragments of chunk 124 can be accessed by an index. In some embodiments, the fragments can be of fixed size such that a fragment can be accessed based on a starting address and a number of indexed jumps to the desired fragment, e.g., for accessing a third fragment of fixed size B and a chunk starting address of A, the address of the third fragment can be A+2B, etc., because the third fragment can be stored three units B into the chunk which starts at address A. Nearly any addressing or indexing schema can be employed within the scope of the instant disclosure and therefore all such addressing schema, even where not explicitly recited for the sake of clarity and brevity, are considered within the scope of the instant disclosure.

In an embodiment, a chunk, as disclosed herein, can comprise non-relevant data, can comprise empty formatted data, can comprise empty unformatted data, etc., e.g., a chunk can be a degraded chunk. As an example, dchunk 116 can comprise one relevant fragment at a second index and eleven non-relevant fragments that can be formatted to 'zero', e.g., the starting fragment of dchunk 116 can be all zeros, the second fragment of dchunk 116 can comprise relevant data, and the third to twelfth fragment of dchunk 116 can comprise all zeros. In this example, convolution, such as by an XOR operation, with another chunk than has twelve relevant fragments, such as chunk 124, etc., can result in a third chunk, such as chunk 136, that has twelve relevant fragments. However, in this example, where only the second fragment of dchunk 116 has values other than zero, the example XOR operation can result in chunk 136 having the first fragment and third to twelfth fragments thereof being the same as the corresponding fragments of chunk 124 and the second fragment of example chunk 136 having values based on an XOR of the second fragment of dchunk 116 with the second fragment of chunk 124. As such, it can be observed that communication of the first and third through twelfth fragments of dchunk 116 in this example can be unnecessary because these fragments do not alter the resulting combined chunk, e.g., example chunk 136.

In an aspect, mapping a logical representation of dchunk 116 to a physical storage address of the data comprising dchunk 116 can enable consumption of less data storage space, for example, by compacting the logical representation. Where a logical representation of dchunk 116 mirrors the physical storage of the data comprising dchunk 116, relevant and non-relevant fragments can be arranged in a manner that results in storing non-relevant fragment content in a convolved chunk, for example, where dchunk 116 physical storage is _____-011-_____-111-_____-_____-_____-_____-_____-_____-_____, and this is mirrored by an uncompacted logical representation of dchunk 116, the logical representation can also be _____-011-_____-111-_____-_____-_____-_____-_____-_____-_____. When this example chunk is convolved, for example with an XOR operation, with another chunk, for example where chunk 124 is 000-111-111-111-000-000-000-000-000-000-111-000, the resulting convoluted chunk, can be 000-100-111-000-000-000-000-000-000-000-111-000. Similarly, if the logical representation of dchunk 116 is compacted, e.g., relevant fragments are shifted left in the logical representation but still map to the unchanged physical representation, the logical representation can be 011-111-_____-_____-_____-_____-_____-_____-_____-_____-_____ and the resulting convolved chunk can be 011-000-111-111-000-000-000-000-000-000-111-000, e.g., and use the same amount of storage resources because the convolution is based on a degraded chunk and a full chunk. However, where the convolution comprises two degraded chunks, the storage space consumed can be reduced. As an example, letting chunk 124 also be a degraded chunk, such as _____-111-111-111-_____-_____-_____-_____-_____-_____-111-_____, a compacted logical representation thereof can be 111-111-111-111-_____-_____-_____-_____-_____-_____-_____-_____, which can be convolved with the compacted logical representation of dchunk 116, e.g., 011-111-_____-_____-_____-_____-_____-_____-_____-_____-_____-_____, and a resulting convolved chunk can be 100-000-111-111-_____-_____-_____-_____-_____-_____-_____-_____, where only the first four fragments are relevant convolved user data, e.g., '100-000-111-111'. Accordingly, the resulting convolved relevant portion, along with the mapping of the constituent compacted logical representations of dchunk 116 and chunk 124, can be stored and can enable recovering the data of dchunk 116 and chunk 124 from the convolved chunk and the mapping data. Accordingly, in this example, the use of compacted logical representations can result in a SCC of 4 fragments plus mapping data in size rather than 12 fragments in size, e.g., storing 100-000-111-111 with mapping data, e.g., using four fragments plus mapping data of storage space, rather than storing any of: 1) an untruncated mapped convolution using 12 fragments plus mapping data of storage space, e.g., 100-000-111-111-_____-_____-_____-_____-_____-_____-_____ with mapping data, 2) an uncompacted convolved chunk resulting from dchunk 116 and the example degraded version of chunk 124 using 12 fragments of storage space, e.g., _____-100-111-000-_____-_____-_____-_____-_____-_____-111-_____, or 3) unconvolved representations of dchunk 116 and the example degraded version of chunk 124 using 24 fragments of storage space, e.g., 011-000-111-_____-_____-_____-_____-_____-_____-_____-_____ and _____-111-111-111-_____-_____-_____-_____-_____-_____-111-_____.

In an aspect, the convolved representation can be mirrored in a new physical storage, e.g., the logical compaction of contributing dchunks can result in a convolved dchunk. As an illustrative example, letting chunks comprise only three fragments and having a first and second dchunk having only one relevant fragment each as follows herein below, then the resulting convolved chunk can also be a dchunk. Where the first dchunk can physically store _____-_____-101, the second dchunk can physically store _____-010-_____, then the resulting convolved chunk can physically store _____-010-101. Applying the disclosed compacting of the logical representation the first chunk can physically store _____-_____-101 and have a compacted logical representation of 101-_____-_____ with corresponding mapping data, the second dchunk can physically store _____-010-_____ and have a compacted logical representation of 010-_____-_____ with corresponding mapping data, then the resulting convolved chunk can physically store 111-_____-_____ and have a compacted logical representation of 111-_____-_____ with mapping data corresponding to the contributing dchunks, which can be simply be reduced to 111 plus mapping data, thereby reducing storage space by approximately ⅔$^{rd}$s in this simple example. The mapping data of the resulting convolved chunk can enable regenerating the contributing dchunks from the compacted physical and logical representations.

In an embodiment, a resulting convolved dchunk can be deconvolved to yield the contributing dchunks. Continuing the previous example, where SCC 136 can be '111' and mapping data, resulting from, for example, an XOR convolution of '101-____-____' and '010-____-____', then given either 101-____-____ or 010-____-____, SCC 136 can be deconvolved to generate the complimentary 101-____-____ or 010-____-____ as follows: '111-____-____' XOR '010-____-____'='101-____-____' and '111-____-____' XOR '101-____-____'='010-____-____'. Further, the mapping information corresponding to SCC 136 can enable mapping the result of the deconvolution from the compacted dchunk to uncompacted originating dchunk representation, e.g., '101-____-____' can be mapped back to '____-____-101' and '010-____-____' can be mapped back to '____-010-000'.

In an aspect, system 100 can comprise chunk table 142 that can communicate with CMC 140 to index addresses of chunk data, store mapping information/data, etc. In an aspect, chunk table 142 can indicate relevant and non-relevant data fragments, chunks, addresses, indexes, etc., related to identifying relevant and/or non-relevant portions of chunks, enable compaction of dchunks, facilitate convolution of a dchunk and another chunk that can be another dchunk, facilitate deconvolution of convolved chunks, etc. In an embodiment, chunk table 142 can be located at a location remote from a ZSC and/or remote from CMC 140. In an embodiment, chunk table 142 can be located at a location local to a ZSC and/or local to CMC 140. In some embodiments chunk table 142 can be comprised in CMC 140. In some embodiments, one or more ZSC can comprise a chunk table, e.g., chunk table 143 comprised in second ZSC 120, etc. As an example, each ZSC can comprise a chunk table, e.g., chunk table 143. In an aspect, chunk table 143 can facilitate chunk management of a chunk stored at second ZSC 120, can facilitate chunk management of a chunk stored at another ZSC such as dchunk 116 of first ZSC 110, etc. CMC 140 can access chunk fragment/mapping data via chunk table 142, chunk table 143, etc., to facilitate data operations supported by a geographically diverse storage system in a manner than can reduce consumption of a storage resource as illustrated herein.

Figure 2:
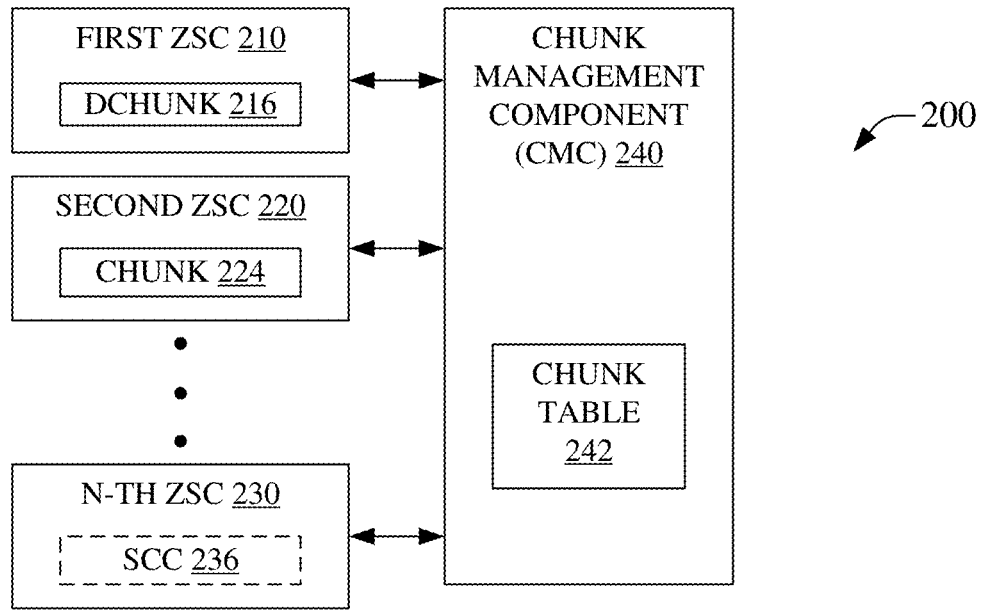
FIG. 2 is an illustration of an example system that can facilitate reducing storage resource consumption via employing a chunk table when generating a convolved chunk comprising a representation of a degraded chunk in a geographically diverse storage construct, in accordance with aspects of the subject disclosure.
Figure 2:
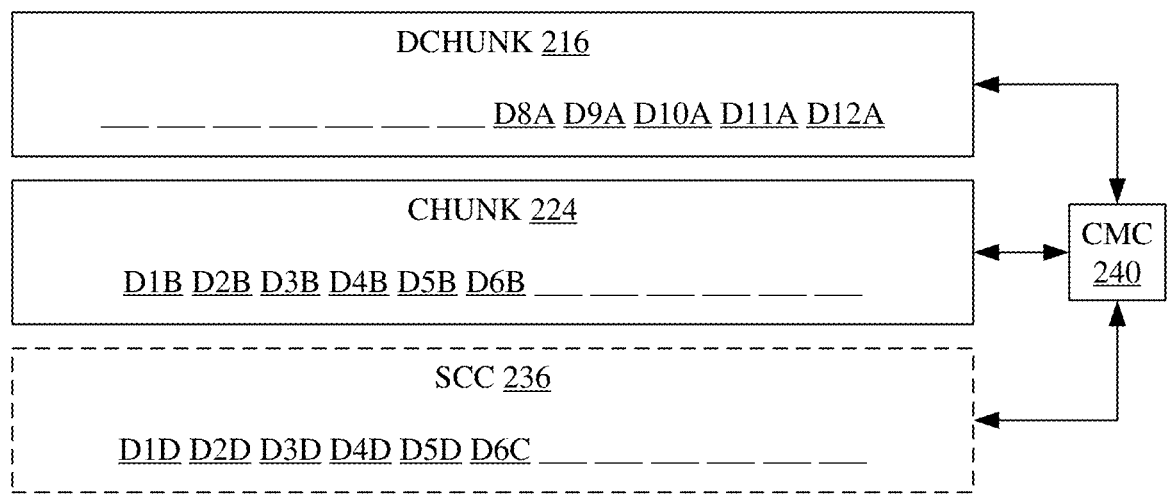

FIG. 2 is an illustration of an example system 200, which can enable reducing storage resource consumption via employing a chunk table when generating a convolved chunk comprising a representation of a degraded chunk in a geographically diverse storage construct, in accordance with aspects of the subject disclosure. System 200, in an embodiment, can facilitate convolving a communicated replica of dchunk 216 data, e.g., representing the data of some, none, or all of dchunk 216, etc., from first ZSC 210 and a communicated replica of chunk 224 from second ZSC 220 into chunk 236 at N-th ZSC 230. As such, chunk 236 can represent the data comprised in dchunk 216 and chunk 224. Moreover, chunk 236 can consume less storage space than the sum of space used by dchunk 216 and chunk 224, and therefore in comparison to simply replicating dchunk 216 and chunk 224 at N-th ZSC 230, the use of chunk 236 can also consume less storage space at N-th ZSC 230. In an aspect, dchunk 216, chunk 224, etc., can comprise relevant user data, irrelevant user data, etc., can be the same size as a non-degraded chunk, can be smaller than a non-degraded chunk, etc. In an aspect, system 200 can comprise communicating data representing relevant user data of dchunk 216, e.g., not communicating non-relevant user data of dchunk 216. System 200 is illustrative of example data fragments comprising dchunk 216, chunk 224, and chunk 236, for example, dchunk 216 can comprise five fragments, D8A to D12A, at an eighth through twelfth indexed location of the chunk structure respectively, and the remaining indexed locations, e.g., the first through seventh fragments, etc., of the chunk structure can comprise non-relevant data. Chunk 224 can comprise six fragments, D1B through D6B, and the seventh to twelfth fragments can comprise non-relevant data. SCC 236 can comprise six fragments, D1D to D5D and D6C, with the seventh to twelfth fragments comprising non-relevant data, etc. Where SCC 236 is a convolution of dchunk 216 and chunk 224, D6C can be the same representation as D6B because convolution of this example representation of shifted relevant portions of dchunk 216 can result in merely copying of the sixth fragment of chunk 224 into SCC 236 at the corresponding indexed chunk structure location, e.g., where a compacted representation of dchunk 216 logically shifts and maps D8A through D12A from the eighth through twelfth indexes to the first through fifth indexes correspondingly, then D6C=(____⊕D6B)=D6B. Similarly, D1D of SCC 236, again where the compacted representation of dchunk 216 logically shifts and maps D8A and D12A from the eighth and twelfth indexes to the first to fifth correspondingly, can be equivalent to (D8A⊕D1B), D2D can be equivalent to (D9A⊕D2B)), D3D can be equivalent to (D10A⊕D3B)), D4D can be equivalent to (D11A⊕D4B)), D5D can be equivalent to (D12A⊕D5B).

In an aspect, where CMC 240 can cause relevant portions of dchunk 216 to be communicated, resulting SCC 236 can be a dchunk that can consume less space than a full chunk, thereby reducing storage resource consumption in contrast to communicating all of dchunk 216, e.g., without compacting dchunk 216, the resulting convolved chunk can comprise twelve fragments in contrast to SCC 236 having only six relevant fragments, allowing SCC 236 to be truncated and consume less storage space. In an aspect, CMC 240 can cause communication of relevant fragments and corresponding mapping data. The mapping data can correlate the relevant fragments to their corresponding indexes associated with the physical storage addresses of the contributing dchunk. In the context of the preceding example, D8A communicated in a first logical index position can be mapped to the eighth fragment position of the physical storage locations of dchunk 216, etc. In some embodiments, compaction of dchunk 216 can occur and be mapped at first ZSC 210. In other embodiments, compaction of dchunk 216 can occur and be mapped at N-th ZSC 230. In further embodiments, compaction of dchunk 216 can occur and be mapped at CMC 240 in conjunction with a chunk table, e.g., chunk table 242, 142, 143, etc.

Figure 3:
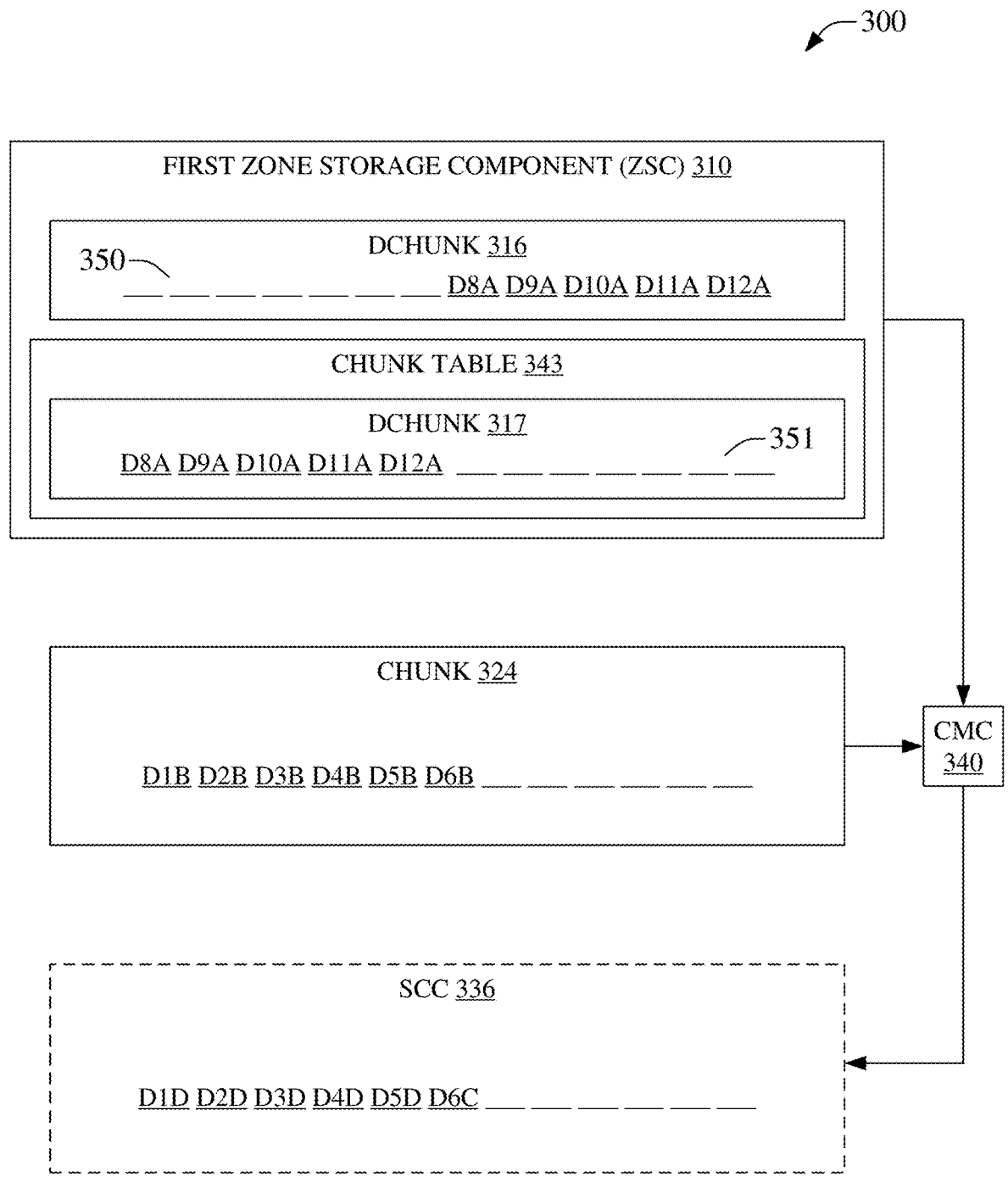
FIG. 3 is an illustration of an example system that can enable reducing storage resource consumption based on generating a representation of a compacted degraded chunk prior to communicating the representation in a geographically diverse storage construct, in accordance with aspects of the subject disclosure.

FIG. 3 is an illustration of an example system 300, which can facilitate reducing storage resource consumption based on generating a representation of a compacted degraded chunk prior to communicating the representation in a geographically diverse storage construct, in accordance with aspects of the subject disclosure. System 300, in an embodiment, can facilitate convolving a communicated replica of dchunk 316 data, such as physical data representation 350, e.g., representing the data of some, none, or all of dchunk 316, etc., from first ZSC 310 and a communicated replica of chunk 324 into chunk 336. As such, chunk 336 can represent the data comprised in dchunk 316, e.g., physical data representation 350, and chunk 324. Moreover, chunk 336 can consume less storage space than the sum of space used by dchunk 316 and chunk 324, and therefore in comparison to simply replicating dchunk 316 and chunk 324, the use of chunk 336 can also consume less storage space. In an aspect, dchunk 316, chunk 324, etc., can comprise relevant user data, irrelevant user data, etc., can be the same size as a non-degraded chunk, can be smaller than a non-degraded chunk, etc. In an aspect, system 300 can comprise communicating data representing relevant user data of dchunk 316, e.g., not communicating non-relevant user data of dchunk 316.

System 300 can be illustrative of example data fragments comprised in dchunk 316, chunk 324, and chunk 336, for example, dchunk 316 can comprise five fragments, D8A to D12A, physically stored at an eighth through twelfth indexed location of the chunk structure on a storage medium respectively, and the remaining indexed locations, e.g., the first through seventh fragments, etc., of the chunk structure can comprise non-relevant data. In an aspect, dchunk 317 can be a logical representation of dchunk 316. In an embodiment, dchunk 317 can represent physical data representation 350 shifted to different logical fragment locations, for example, logical data representation 351 can represent D8A through D12A as correspondingly logically compacted to the first to fifth fragment locations in logical data representation 351 while D8A through D12A can remain at the same physical storage locations illustrated in physical data representation 350. Chunk 324 can comprise six fragments, D1B through D6B, and the seventh to twelfth fragments can comprise non-relevant data. SCC 336 can comprise six fragments, D1D to D5D and D6C, with the seventh to twelfth fragments comprising non-relevant data, etc.

SCC 336 can be a convolution of dchunk 316 and chunk 324, e.g., a convolution of the logical data representation 351 of dchunk 317 with chunk 324, such that D6C can be the same representation as D6B because the shifted relevant portions of dchunk 316, e.g., physical data representation 350 in dchunk 316 being compacted into dchunk 317 with logical data representation 351, can result in merely copying of the sixth fragment of chunk 324 into SCC 336 at the corresponding indexed chunk structure location, e.g., where a compacted representation, e.g., dchunk 317, logically shifts and maps D8A through D12A from the eighth through twelfth indexes of physical data representation 350 to the first through fifth indexes of logical data representation 351 correspondingly, then D6C=(_____⊕D6B)=D6B. Similarly, as a result of compacting physical data representation 350 into logical data representation 351, D1D of SCC 336 can be equivalent to (D8A⊕D1B), D2D can be equivalent to (D9A⊕D2B)), D3D can be equivalent to (D10A⊕D3B)), D4D can be equivalent to (D11A⊕D4B)), D5D can be equivalent to (D12A⊕D5B).

In an aspect, where CMC 340 can cause relevant portions of dchunk 316 to be communicated, resulting SCC 336 can be a dchunk that can consume less space than a full chunk, thereby reducing storage resource consumption in contrast to communicating all of dchunk 316, e.g., without compacting dchunk 316, the resulting convolved chunk can comprise twelve fragments in contrast to SCC 336 having only six relevant fragments, allowing SCC 336 to be truncated and consume less storage space. In an aspect, CMC 340 can cause communication of relevant fragments, e.g., via logical data representation 351, etc., and corresponding mapping data. The mapping data can correlate the relevant fragments to their corresponding logical indexes, e.g., via logical data representation 351, associated with the physical storage addresses of the contributing dchunk, e.g., of physical data representation 350. In the context of the preceding example, D8A communicated in a first logical index position of logical data representation 351 can be mapped to the eighth fragment position of the physical storage locations of dchunk 316, e.g., physical data representation 350. In an embodiment, compaction of dchunk 316 can occur and be mapped at first ZSC 310. Compaction of dchunk 316 can be mapped via chunk table 343. In some embodiments, mapping can occur at a ZSC, e.g., first ZSC 310, etc., and mapping data can be stored in a chunk table outside of the ZSC, e.g., at chunk table 343, 142, 143, etc. In an aspect, mapping data can be comprised in the logical representation of the chunk itself, rather than in a chunk table, for example, compacting physical data representation 350 into logical data representation 351 can comprise storing mapping information corresponding to the compaction event(s) in dchunk 317. As such, mapping data can be communicated with the logical data representation itself, can be stored at a chunk table, can be both stored at a chunk table and in a logical data representation, etc. It will be noted that SCC 336 can be stored in a truncated form so as to consume less storage space. In an aspect, where SCC 336 is truncated, mapping data can be stored with the truncated chunk, in a chunk table, in both a chunk table and in the truncated chunk, etc. The mapping data of SCC 336 can enable deconvolution of SCC 336 to restore one or more of chunk 324, chunk 317, chunk 316, etc.

Figure 4:
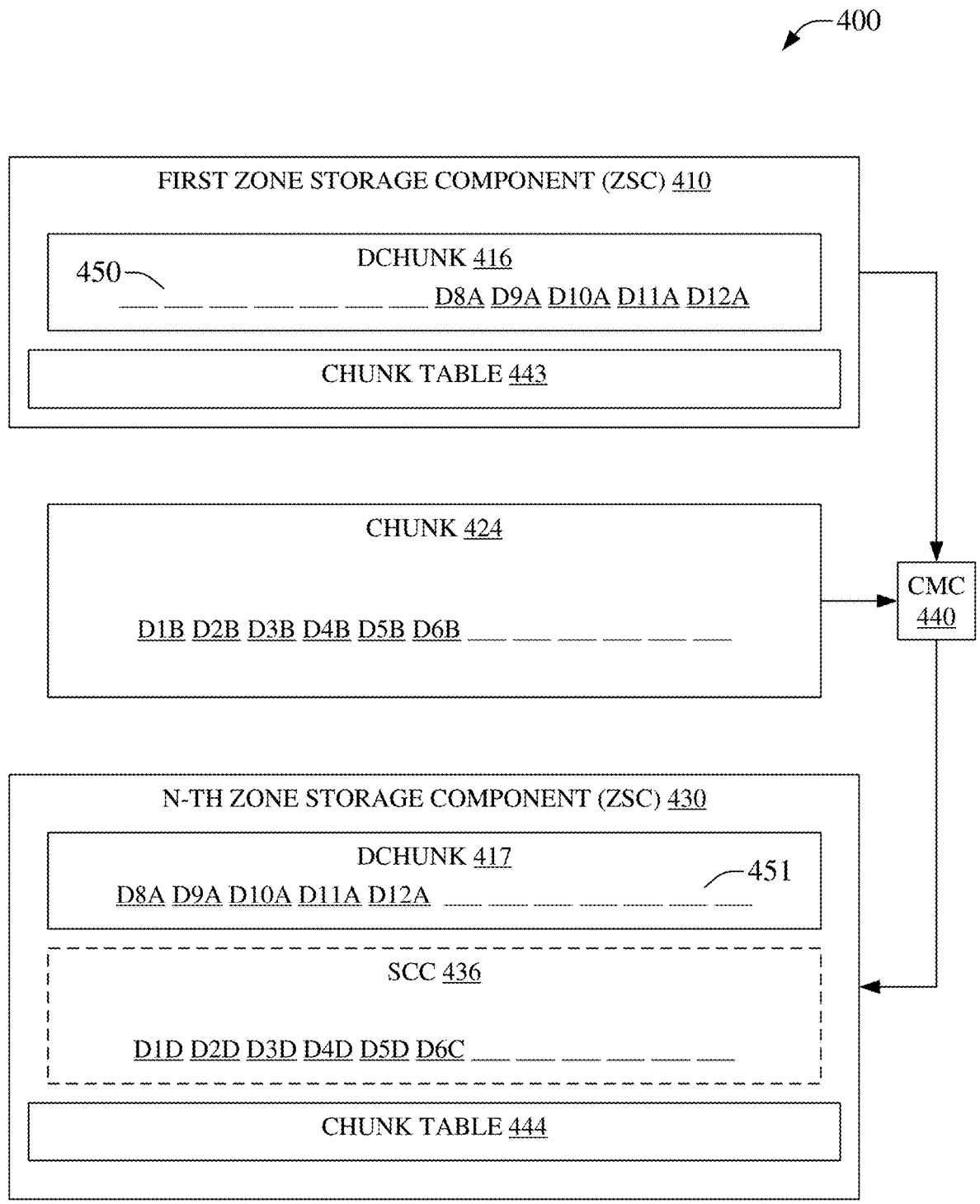
FIG. 4 illustrates an example system that can enable reducing storage resource consumption based on generating a second representation of a compacted degraded chunk after communicating a first representation of the degraded chunk in a geographically diverse storage construct, in accordance with aspects of the subject disclosure.

FIG. 4 is an illustration of an example system 400, which can enable reducing storage resource consumption based on generating a second representation of a compacted degraded chunk after communicating a first representation of the degraded chunk in a geographically diverse storage construct, in accordance with aspects of the subject disclosure. System 400, in an embodiment, can facilitate convolving a communicated replica of dchunk 416 data, such as physical data representation 450, e.g., representing the data of some, none, or all of dchunk 416, etc., from first ZSC 410 and a communicated replica of chunk 424 into chunk 436 at N-th ZSC 430. As such, chunk 436 can represent the data comprised in dchunk 416, e.g., physical data representation 450, and chunk 424. Moreover, chunk 436 can consume less storage space than the sum of space used by dchunk 416 and chunk 424, and therefore in comparison to simply replicating dchunk 416 and chunk 424, the use of chunk 436 can also consume less storage space. In an aspect, dchunk 416, chunk 424, etc., can comprise relevant user data, irrelevant user data, etc., can be the same size as a non-degraded chunk, can be smaller than a non-degraded chunk, etc. In an aspect, system 400 can comprise communicating data representing relevant user data of dchunk 416, e.g., not communicating non-relevant user data of dchunk 416.

System 400 can be illustrative of example data fragments comprised in dchunk 416, chunk 424, and chunk 436, for example, dchunk 416 can comprise five fragments, D8A to D12A, physically stored at an eighth through twelfth indexed location of the chunk structure on a storage medium respectively, and the remaining indexed locations, e.g., the first through seventh fragments, etc., of the chunk structure can comprise non-relevant data. Chunk 424 can comprise six fragments, D1B through D6B, and the seventh to twelfth fragments can comprise non-relevant data. In an aspect, dchunk 417 can be generated at N-th ZSC 430 and can be a logical representation of dchunk 416. In an embodiment, dchunk 417 can represent physical data representation 450 shifted to different logical fragment locations, for example, logical data representation 451 can represent D8A through D12A as correspondingly logically compacted to the first to fifth fragment locations in logical data representation 451 while D8A through D12A can remain at the same physical storage locations illustrated in physical data representation 450. SCC 436 can comprise six fragments, D1D to D5D and D6C, with the seventh to twelfth fragments comprising non-relevant data, etc.

SCC 436 can be a convolution of dchunk 416 and chunk 424, e.g., a convolution of the logical data representation 451 of dchunk 417 with chunk 424, such that D6C can be the same representation as D6B because the shifted relevant portions of dchunk 416, e.g., physical data representation 450 in dchunk 416 being compacted into dchunk 417 with logical data representation 451, can result in merely copying of the sixth fragment of chunk 424 into SCC 436 at the corresponding indexed chunk structure location, e.g., where a compacted representation, e.g., dchunk 417, logically maps D8A through D12A shifted from the eighth through twelfth indexes of physical data representation 450 to the first through fifth indexes of logical data representation 451 correspondingly, then D6C=(_____$\oplus$D6B)=D6B. Similarly, as a result of compacting physical data representation 450 into logical data representation 451, D1D of SCC 436 can be equivalent to (D8A$\oplus$D1B), D2D can be equivalent to (D9A$\oplus$D2B)), D3D can be equivalent to (D10A$\oplus$D3B)), D4D can be equivalent to (D11A$\oplus$D4B)), D5D can be equivalent to (D12A$\oplus$D5B).

In an aspect, where CMC 440 can cause relevant portions of dchunk 416 to be communicated, resulting SCC 436 can be a dchunk that can consume less space than a full chunk, thereby reducing storage resource consumption in contrast to communicating all of dchunk 416, e.g., without compacting dchunk 416 into dchunk 417, the resulting convolved chunk can comprise twelve fragments in contrast to SCC 436 having only six relevant fragments, allowing SCC 436 to be truncated and consume less storage space. In an aspect, CMC 440 can cause communication of relevant fragments, e.g., resulting in generation logical data representation 451 at N-th ZSC 430, etc., and facilitate communication of corresponding mapping data. In an aspect, where the compaction occurs outside of first ZSC 410, communication of corresponding mapping data can comprise communicating the mapping data back to the example first ZSC 410 to facilitate storage of the mapping data at chunk table 443. The mapping data can correlate the relevant fragments to their corresponding logical indexes, e.g., via logical data representation 451, associated with the physical storage addresses of the contributing dchunk, e.g., of physical data representation 450. In the context of the preceding example, D8A represented in a first logical index position of logical data representation 451 can be mapped to the eighth fragment position of the physical storage locations of dchunk 416, e.g., physical data representation 450. In an embodiment, compaction of dchunk 416 can occur, for example, outside of first ZSC 410, such as at CMC 440, at N-th ZSC 430, etc. Compaction of dchunk 416 can be mapped and communicated back to chunk table 443 for storage. In some embodiments, mapping information can be stored in a chunk table outside of the ZSC comprising the originating dchunk, for example, mapping data for dchunk 417 to dchunk 416 can be stored at chunk table 444, 142, 143, etc. In an aspect, mapping data can be comprised in the logical representation of the chunk itself, for example, compacting physical data representation 450 into logical data representation 451 can comprise storing mapping information corresponding to the compaction event(s) in dchunk 417 itself. As such, mapping data can be present in the logical data representation itself, enabling communication of the mapping data with the logical data representation. In some embodiments, the mapping data can alternatively be stored both at a chunk table and in a logical data representation itself. It will be noted that SCC 436 can be stored in a truncated form so as to consume less storage space. In an aspect, where SCC 436 is truncated, mapping data can be stored with the truncated chunk, in a chunk table, in both a chunk table and in the truncated chunk, etc. The mapping data of SCC 436 can enable deconvolution of SCC 436 to restore one or more of chunk 424, chunk 417, chunk 416, etc.

Figure 5:
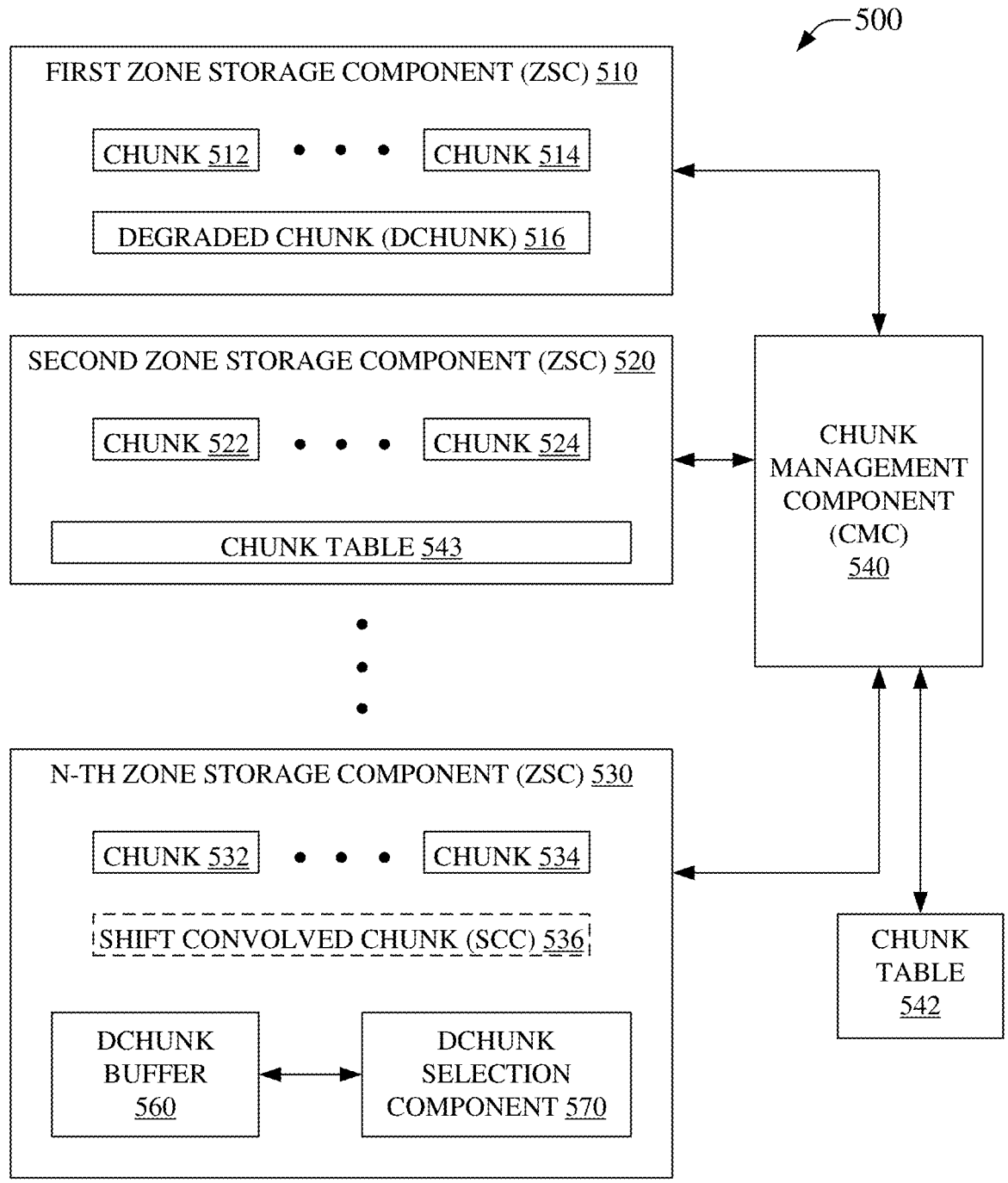
FIG. 5 is an illustration of an example system that can facilitate reducing storage resource consumption by employing a degraded chunk buffer and corresponding degraded chunk selection component in a geographically diverse storage construct, in accordance with aspects of the subject disclosure.

FIG. 5 is illustrates example system 500, which can enable reducing storage resource consumption by employing a degraded chunk buffer and corresponding degraded chunk selection component in a geographically diverse storage construct, in accordance with aspects of the subject disclosure. System 500 can comprise zone storage components (ZSCs), e.g., first ZSC 510 comprising chunk 512-514 and dchunk 516, second ZSC 520 comprising chunk 522-524, N-th ZSC 530 comprising chunk 532-534, etc. In an embodiment, chunks can be managed by CMC 540 that can facilitate convolving chunks from one or more ZSCs at another ZSC. As an example, CMC 540 can facilitate convolving dchunk 516 with chunk 524 to form SCC 536 at ZSC 530.

In an embodiment of the disclosed subject matter, convolving of a dchunk, e.g., dchunk 516, etc., with another chunk can, as disclosed herein result in a chunk that can be of typical size for non-degraded chunk, e.g., convolving a degraded chunk with a non-degraded chunk can result in a non-degraded chunk, convolving two degraded but non compacted chunks can result in a non-degraded chunk, etc. However, convolving of a first dchunk with a second dchunk can result in a degraded chunk that can be truncated to consume fewer storage resources than storing a non-degraded chunk. As an example, where a first dchunk has a first fragment at the first index of the first dchunk and the second dchunk has a first fragment at the second index of the second dchunk, then the resulting convolved chunk can have relevant data at only the first and second indexes of the convolved chunk and can be stored in a truncated form to consume two fragments of space rather than, for example twelve fragments of space. In an embodiment, compacting the example first and second dchunks can result in logical representations having relevant data in the first indexes and the resulting convolved dchunk can correspondingly have relevant data in the first index, for example consuming one fragment of space in a truncated format, in addition to some mapping data, rather than the example twelve fragments of space in an non-truncated format. As an illustrative example, letting chunks comprise only three fragments and having a first and second dchunk having only one relevant fragment where the first dchunk can physically store _____-_____-101, the second dchunk can physically store _____-010-_____, then the resulting convolved chunk can physically store _____-010-101. Applying the disclosed compacting of the logical representation the first chunk can physically store _____-_____-101 and have a compacted logical representation of 101-_____-_____ with corresponding mapping data, the second dchunk can physically store _____-010-_____ and have a compacted logical representation of 010-_____-_____ with corresponding mapping data, then the resulting convolved chunk can physically store 111-_____-_____ and have a compacted logical representation of 111-_____-_____ with mapping data corresponding to the contributing dchunks, which can be simply be reduced to '111' plus mapping data, thereby reducing storage space by approximately $\frac{2}{3}^{rds}$ in this simple example. The mapping data of the resulting convolved chunk can enable regenerating the contributing dchunks from the compacted physical and logical representations. Mapping data can be stored in SCC 536, chunk table 543, chunk table 542, etc., and can facilitate deconvolving operations to yield the contributing dchunks.

In an aspect, system 500 can comprise a dchunk buffer, e.g., dchunk buffer 560, etc., that can store a cache of dchunk representations pursuant to convolving the dchunks with other dchunk or other chunks. As is noted herein, convolving a dchunk with a full chunk can result in a chunk that can consume less storage space than storing a copy of the dchunk and a copy of the cull chunk, but additional storage space savings can occur where the dchunk is convolved with another dchunk to result in a convolved chunk that itself is a dchunk and can be stored in a truncated form, more especially in view of the disclosed dchunk compaction. As such, it can be desirable to reduce storage resource consumption by buffering dchunks until other dchunks are availed for convolution operations. As an example, where a first dchunk, e.g., dchunk 516, comprises only one relevant user data fragment, more storage space can be saved by buffering the first dchunk until another dchunk is available than to convolve the first dchunk with a full chunk. In an aspect, convolving similar sized dchunks, e.g., dchunks having a similar number of compacted user data fragments can result in convolved chunks that have corresponding convolved fragment counts and can be an effective storage space savings scheme. In an aspect, convolving a dchunk having 'v' chunks, with a dchunk having 'w' chunks, where v is less than or equal to w, can yield a convolved dchunk having w fragments and therefore convolving chunks where 'v' is similar to, or the same as, 'w' can improve storage space savings. As an example, where a one-fragment dchunk, a three-fragment dchunk, and an eleven-fragment dchunk are available for convolution, convolving the one- and three-fragment dchunks yields a three-fragment dchunk, while convolving either the one- or three-fragment dchunk with the eleven-fragment dchunk will yield an eleven-fragment dchunk, e.g., ('1-f' XOR '3-f')='3-f' and '3-f'+'11-f' can use 14 fragments of storage space, and similarly ('1-f' XOR '11-f')='11f' and '11-f'+'3-f' can use 14 fragments of storage space, while in contrast ('3-f' XOR '11-f')='11f' and '11-f'+'1-f' can use 12 fragments of storage space. In an aspect, dchunk buffer 560 can be embodied in one or more ZSCs, in CMC 540, in another local or remotely located component not illustrated for the sake of clarity and brevity, etc.

System 500 can further comprise a dchunk selection component, e.g., dchunk selection component 570, that can facilitate selection of buffered dchunks/chunks, e.g., from a dchunk buffer such as dchunk buffer 560, from as ZSC, etc., for convolution operations. The selections can be based on a rule, for example, a rule related to ranking dchunk sizes, to optimizing storage space consumption savings via compacted dchunks, a duration of a dchunk residency in a buffer, a rank of durations of dchunk residencies in a buffer, indications of data/client value, etc. As an example, a rule can indicate that a dchunk ranking increases relative to other dchunks residing in a buffer as a function of time resident in the buffer and that dchunks associated with a designated client have an improved rank, such that a dchunk that is associated with the client is more likely to be convolved promptly than a similar dchunk not associated with the client and that the older a dchunk gets in the buffer the more likely it is to be convolved even where another dchunk of similar size is not available in the buffer. Numerous other examples are readily appreciated and within the scope of the present disclosure even where not explicitly recited for the sake of clarity and brevity. In an aspect, dchunk selection component 570 can be embodied in one or more ZSCs, in CMC 540, in another local or remotely located component not illustrated for the sake of clarity and brevity, etc.

Figure 6:
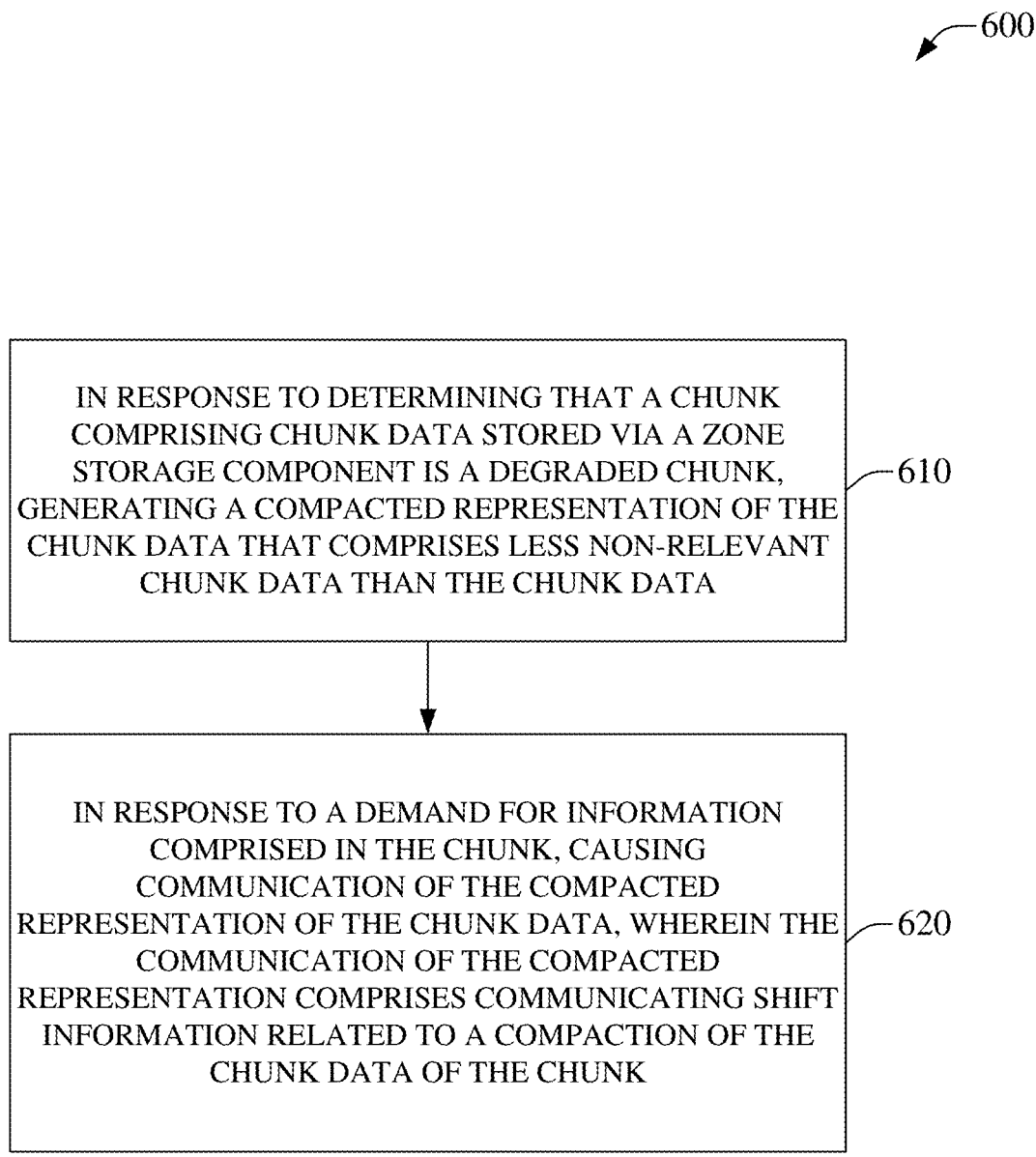
FIG. 6 is an illustration of an example method facilitating reducing storage resource consumption when communicating a representation of a compacted degraded chunk in a geographically diverse storage construct, in accordance with aspects of the subject disclosure.
Figure 7:
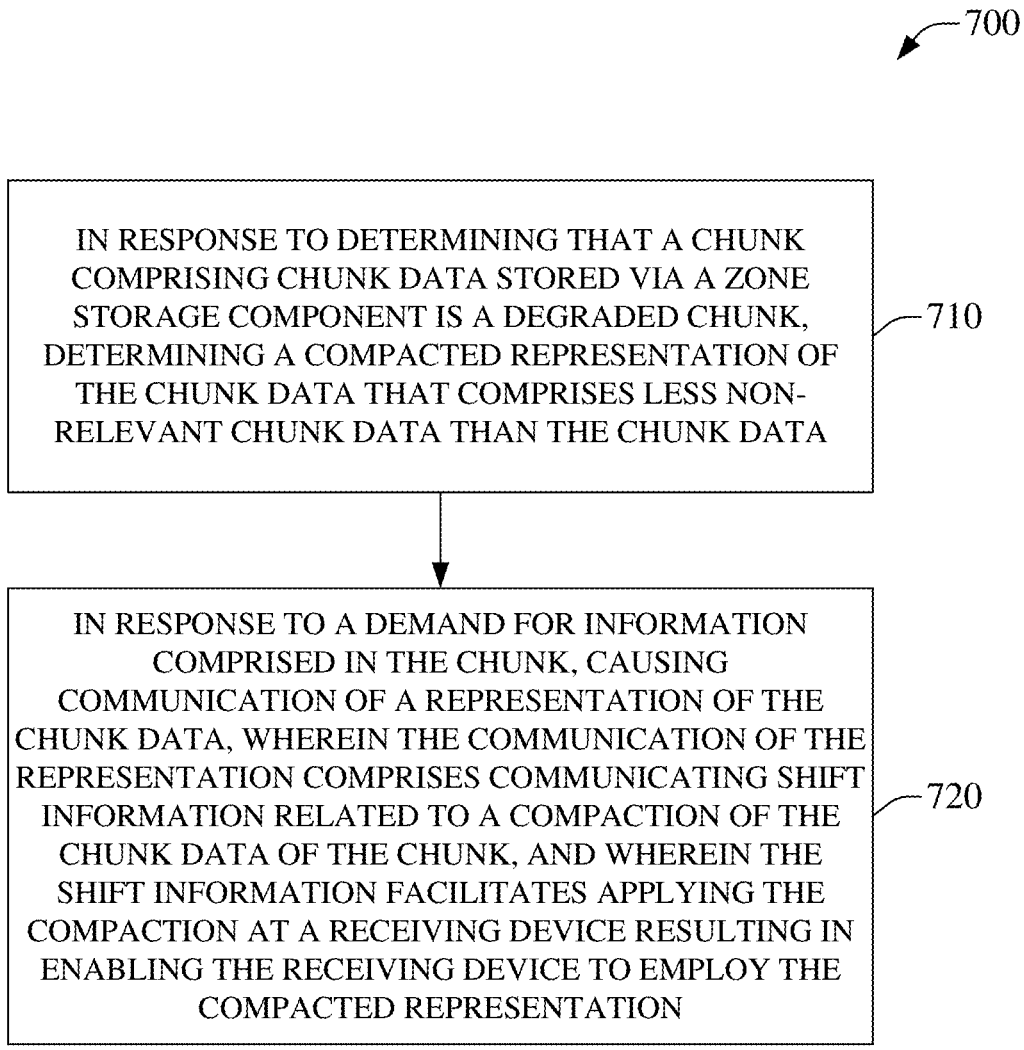
FIG. 7 is an illustration of an example method enabling reducing storage resource consumption when receiving a degraded chunk that facilitates generation of a compacted representation of the degraded chunk in a geographically diverse storage construct, in accordance with aspects of the subject disclosure.
Figure 8:
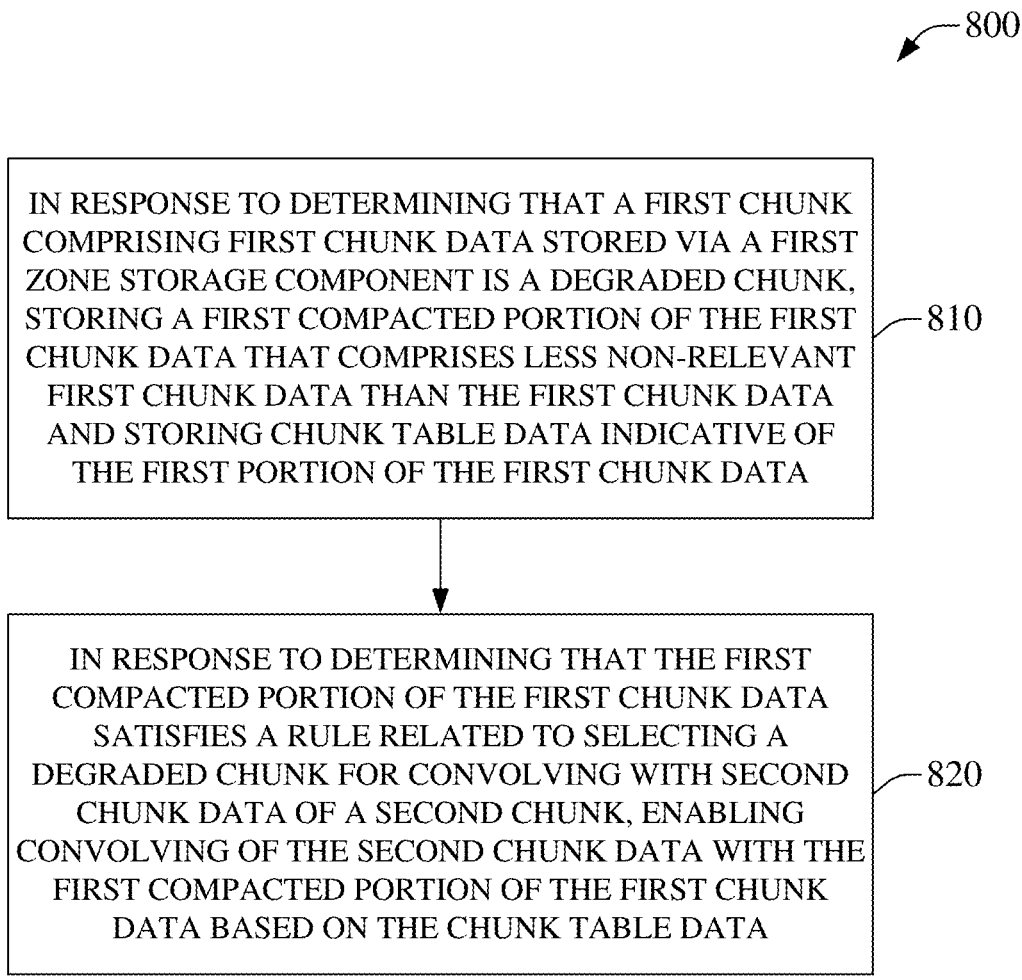
FIG. 8 illustrates an example method that enables reducing storage resource consumption by buffering representations of a degraded chunks and employing selective convolving with another chunk in a geographically diverse storage construct, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate reducing storage resource consumption when communicating a representation of a compacted degraded chunk in a geographically diverse storage construct, in accordance with aspects of the subject disclosure. At 610, method 600 can comprise generating a compacted representation of chunk data that comprises less non-relevant chunk data than the chunk data. The generating can be in response to determining that the chunk comprising the chunk data is a degraded chunk. In an aspect the chunk can be stored via a zone storage component of a geographically diverse storage system. A degraded chunk can be a chunk that can comprise non-relevant data, can comprise empty formatted data, can comprise empty unformatted data, etc. A representation of the degraded chunk can comprise relevant user data, non-relevant data, empty space, formatted space, etc. A compacted representation can be a logical representation that groups user data fragments, e.g., a physically stored representation of the chunk data can correspond to a logical representation wherein the logical fragments can be grouped in different positions than, but still map to, the physical representation. As an example, a compacted representation of user data stored physically as _____-011-_____-111-_____-_____-_____-_____-_____-_____-_____ can be 011-111-_____-_____-_____-_____-_____-_____-_____-_____-_____, wherein the relevant user data is left-shifted to the first and second indexed logical locations and map to the second and fourth physical storage indexed locations.

At 620, method 600 can comprise causing communication of the compacted representation of the chunk data in response to a demand for the information comprised in the chunk. At this point method 600 can end. In an aspect, the communication of the compacted representation can comprise communicating shift information related to the compaction of the chunk data of the chunk. Continuing the above example, the shift information can indicate that the second physical fragment is shifted to the first index of the compacted representation and that the fourth physical fragment is shifted to the first index of the compacted representation. In an aspect, where the balance of the compacted representation does not comprise relevant user data, this portion of the compacted representation can be avoided, which can reduce communication resource consumption.

In an aspect, the generating the compacted representation can be correlated with generating mapping data, which can comprise the shift information. The mapping data can be comprised in the compacted representation, can be comprised in a chunk table in a ZSC of the geographically diverse storage system, can be comprised in a remotely located chunk table, can be comprised in a chunk management component, etc. In an aspect the mapping data, e.g., the shift data, etc., can enable data operations involving the compacted representation that can relate to the physical representation of the data. In an aspect, where a data operation is a convolution with another chunk/dchunk, the mapping data can enable a subsequent deconvolution operation to extract data of the data chunk into the compacted representation, representation, etc. As an example, a first dchunk can be regenerated, based on the mapping data, from deconvolution of a convolved chunk that was generated with a compacted representation of the first dchunk.

FIG. 7 is an illustration of an example method 700, which can facilitate reducing storage resource consumption when receiving a degraded chunk that facilitates generation of a compacted representation of the degraded chunk in a geographically diverse storage construct, in accordance with aspects of the subject disclosure. At 710, method 700 can comprise determining a compacted representation of chunk data that comprises less non-relevant chunk data than the chunk data. The determining can be in response to determining that the chunk comprising the chunk data is a degraded chunk. In an aspect the chunk can be stored via a zone storage component of a geographically diverse storage system. A degraded chunk can be a chunk that can comprise non-relevant data, can comprise empty formatted data, can comprise empty unformatted data, etc. A representation of the degraded chunk can comprise relevant user data, non-relevant data, empty space, formatted space, etc. A compacted representation can be a logical representation that groups user data fragments, e.g., a physically stored representation of the chunk data can correspond to a logical representation wherein the logical fragments can be grouped in different positions than, but still map to, the physical representation. As an example, a compacted representation of user data stored physically as _____-011_____-111-_____-_____-_____-_____-_____-_____- can be 011-111-_____-_____-_____-_____-_____-_____-_____-_____, wherein the relevant user data is left-shifted to the first and second indexed logical locations and map to the second and fourth physical storage indexed locations.

At 720, method 700 can comprise causing communication of a representation of the chunk data in response to a demand for the information comprised in the chunk, wherein the determination of the compacted representation enables a receiving device to employ the compacted representation. At this point method 700 can end. In an aspect, the communication of the representation can comprise communicating shift information related to the determined compacted representation of the chunk data of the chunk. Accordingly, a receiving device can generate a compacted representation based on the communicated representation and the communicated shift information. As an example, shift information can be determined for a dchunk at a first ZSC, such that the dchunk data and the shift information can be communicated to a second ZSC that can generate a compacted representation of the dchunk at the second ZSC based, in part, on the shift information. Moreover, the shift information, for example comprised in mapping information, can be comprised in the compacted representation, can be comprised in a chunk table in a ZSC of the geographically diverse storage system, can be comprised in a remotely located chunk table, can be comprised in a chunk management component, etc. The mapping/shift data can enable data operations involving the compacted representation that can relate to the physical representation of the example dchunk data. In an aspect, where a data operation is a convolution with another chunk/dchunk, the mapping data can enable a subsequent deconvolution operation to extract data of the data chunk into the compacted representation, the representation, etc., e.g., based on the mapping information, the first dchunk can be regenerated from deconvolution of a convolved chunk that was generated with a compacted representation of the dchunk.

FIG. 8 is an illustration of an example method 800, which can enable reducing storage resource consumption by buffering representations of a degraded chunks and employing selective convolving with another chunk in a geographically diverse storage construct, in accordance with aspects of the subject disclosure. At 810, method 800 can comprise storing a first compacted portion of first chunk of a first chunk that comprises less non-relevant first chunk data than the first chunk data and storing chunk table data indicative of the first portion of the first chunk data. The storing the first compacted portion can be in response to determining that the first chunk is a degraded chunk. In an aspect the first chunk can be stored via a first zone storage component of a geographically diverse storage system.

At 820, method 800 can comprise enabling convolving of second chunk data with the first compacted portion of the first chunk data. The enabling convolving can be based on the chunk table data. Moreover, the enabling convolving can be in response to determining that the first compacted portion of the first chunk data satisfies a rule, wherein the rule can be related to selecting a degraded chunk for convolving with the second chunk data of a second chunk. In an aspect, the chunk table data can comprise mapping data related to mapping the first compacted portion of the first chunk data to the first chunk data. In an aspect, where a data operation is the convolution with the second chunk data, the mapping data can enable a subsequent deconvolution operation to extract the first chunk data, based on the mapping information, via deconvolution of the convolved chunk that was generated with the compacted portion and the second chunk data.

Figure 9:
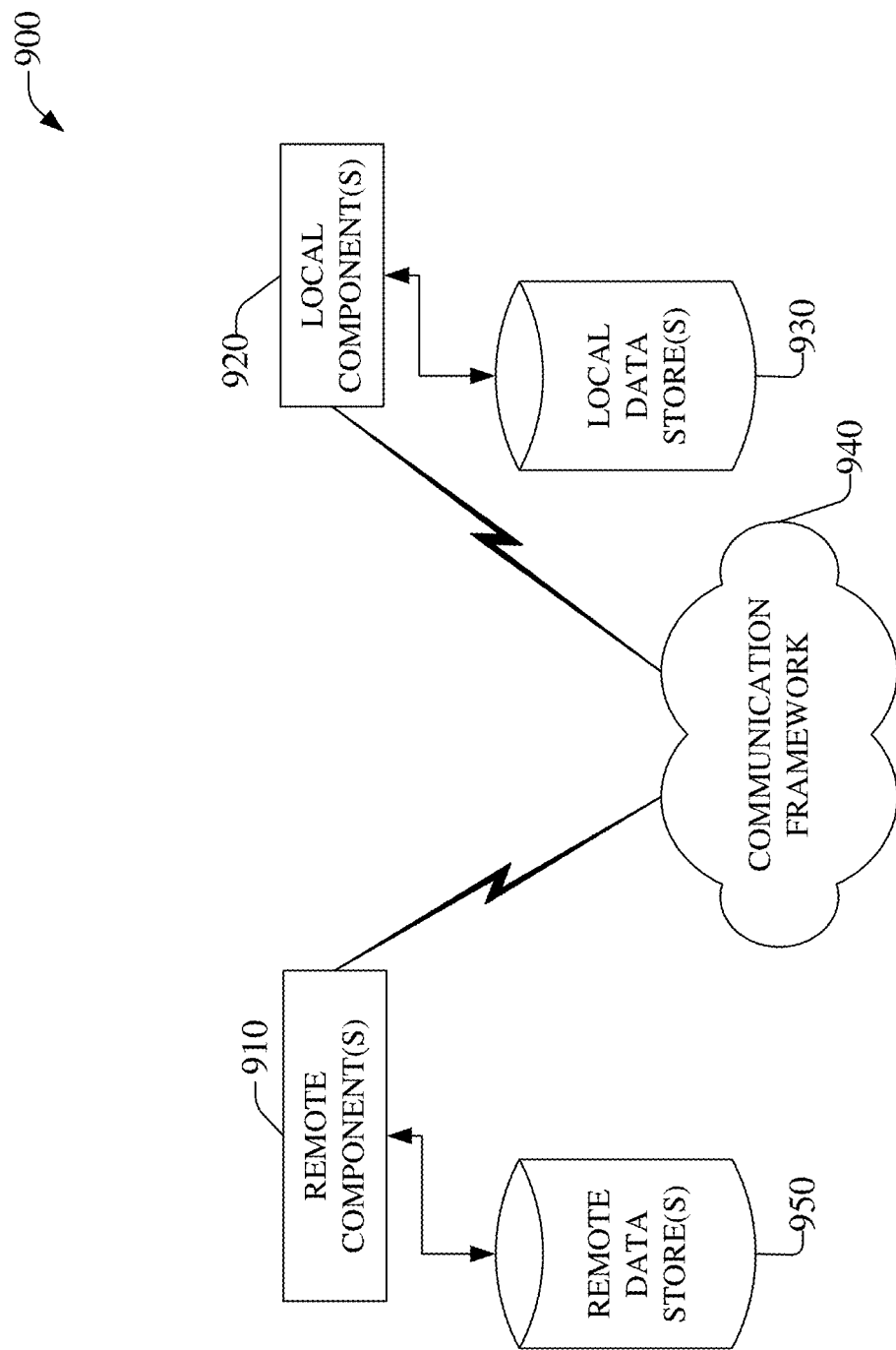
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. In an aspect the remotely located ZSC or local ZSC can be embodied in ZSCs 110, 120, 130, 210, 220, 230, 310, 410, 430, 510, 520, 530, etc., In some embodiments, remote component(s) 910 can be a chunk table, e.g., chunk table 142, 143, 242, 343, 443, 444, 453, etc., a chunk management component 140-540, etc., chunk buffer 560, dchunk selection component 570, etc., or other component. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSCs 110, 120, 130, 210, 220, 230, 310, 410, 430, 510, 520, 530, etc. In some embodiments, local component(s) 920 can be chunk table 142, 143, 242, 343, 443, 444, 453, etc., chunk management component 140-540, etc., chunk buffer 560, dchunk selection component 570, etc., or other component.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to chunks stored on ZSCs can be communicated via communication framework 940 to other ZSCs of a storage network, e.g., to facilitate compression, storage in partial or complete chunks, deletion of chunks, etc., on/from a ZSC as disclosed herein. As another example, compacted or uncompacted relevant/non-relevant user data information corresponding to a degraded chunk stored on ZSCs can be communicated via communication framework 940 to other ZSCs of a storage network, to chunk table 142, 143, 242, 343, 443, 444, 453, etc., a chunk management component 140-540, etc., chunk buffer 560, dchunk selection component 570, etc., or other component.

Figure 10:
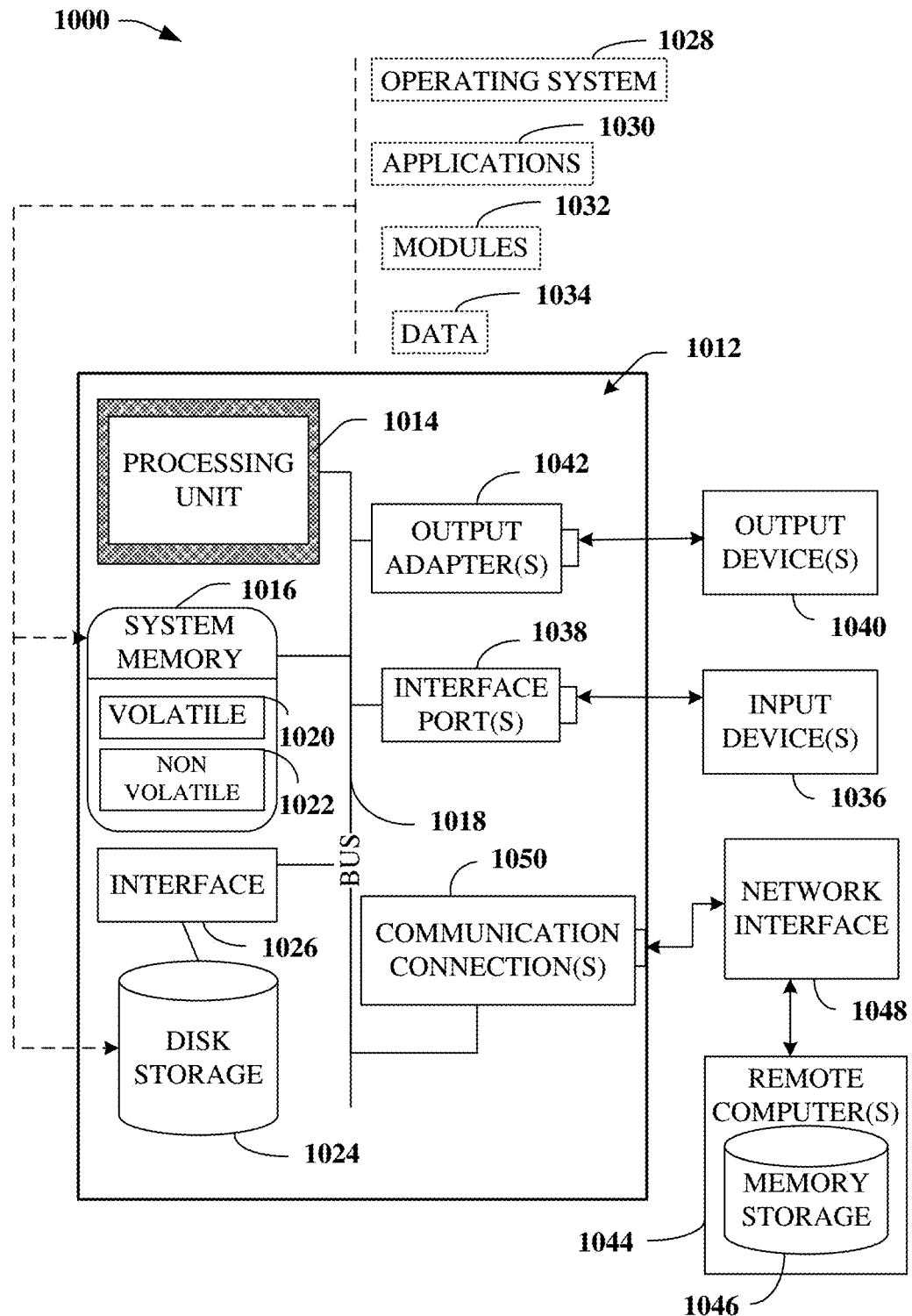
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 130, etc., comprised in CMC 140-540, etc., comprised in chunk table 142, 242, etc., dchunk buffer 560, etc., dchunk selection component 570, etc., or comprised in nearly any other component germane to the presently disclosed subject matter herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising generating a compressed chunk logically representing physical locations of a first chunk, and generating a truncated convolved chunk based on the compressed chunk and a second chunk, wherein the truncated convolved chunk uses less storage space than a full convolved chunk based on the first chunk and the second chunk.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to determining that a first chunk comprises a first fragment of relevant data and a second fragment of non-relevant data, determining a mapping of first chunk fragments comprising the first fragment and the second fragment that results in logically grouping first chunk relevant data fragments comprising the first fragment into a first group and logically grouping first chunk non-relevant fragments comprising the second fragment in to a second group, wherein the first group is aligned at a first index of a logical data structure and the second group is aligned at a second index of the logical data structure, wherein the first group does not overlap the second group in the logical data structure, wherein the first chunk is immutable, wherein the first chunk is stored on a first storage device of a geographically diverse data storage system, and wherein the mapping correlates indexes of the logical data structure to storage locations of the first chunk fragments on the first storage device of the geographically diverse data storage system; and
generating a convolved chunk based on a second chunk stored on a second storage device of the geographically diverse data storage system, at least the first chunk relevant data fragments according to the first group, and the mapping of the first chunk fragments, wherein the convolved chunk comprises a compressed representation of the first chunk relevant data fragments, wherein the second chunk is immutable, and wherein the convolved chunk is immutable.

2. The system of claim 1, wherein the first storage device is comprised in a first zone of the geographically diverse data storage system, wherein the second storage device is comprised in a second zone of the geographically diverse data storage system, and wherein the first zone is a different zone than the second zone.

3. The system of claim 2, wherein the convolved chunk is stored on a third storage device comprised in a third zone of the geographically diverse data storage system that is a different zone than the first zone and a is different zone than the second zone.

4. The system of claim 1, wherein, based on the mapping of the first chunk fragments, the convolved chunk is subsequently deconvolved to generate a representation of the first chunk.

5. The system of claim 1, wherein the operations further comprise generating the compressed representation of the first chunk relevant data fragments at the first zone based on the mapping, and wherein the compressed representation consumes less storage space than the first chunk.

6. The system of claim 1, wherein the operations further comprise generating the compressed representation of the first chunk relevant data fragments at a third zone based on the mapping, wherein the third zone is a different zone than the first zone, wherein the compressed representation consumes less storage space than the first chunk, and wherein the generating the convolved chunk generates the convolved chunk at a third storage device of the third zone.

7. The system of claim 1, wherein the generating the convolved chunk comprises generating the convolved chunk at a third storage device of a third zone that is a different zone than the first zone and a different zone than the second zone, wherein the third zone comprises a storage buffer, wherein the storage buffer stores a first representation of the first chunk according to the mapping of the first chunk fragments and a second representation of the second chunk, and wherein the first representation and the second representation are selected to be convolved in response to determining that a first selection rule related to comparing the size of the first representation and the second representation has been satisfied.

8. The system of claim 7, wherein the first representation and the second representation are selected to be convolved in response to further determining that a second selection rule related to an elapsed time that the first representation has been stored in the buffer has been satisfied.

9. The system of claim 7, wherein the first representation and the second representation are selected to be convolved in response to further determining that a third selection rule related to a level of importance attributed to the data represented in the first representation has been satisfied.

10. The system of claim 1, wherein the mapping of the first chunk fragments is a first mapping, and wherein the generating the convolved chunk comprises generating the convolved chunk based on second chunk relevant data fragments of the second chunk, the first chunk relevant data fragments, the first mapping, and a second mapping of the second chunk data fragments.

11. The system of claim 10, wherein the first mapping corresponds to a first compressed representation of the first chunk and wherein the second mapping corresponds to a second compressed representation of the second chunk.

12. A method, comprising:
determining, by a system comprising processor and a memory, a first compressed representation of first relevant fragments of a first chunk stored at a first zone of a geographically diverse data storage system, wherein the first chunk is immutable, wherein the first compressed representation is a first logical grouping of the first relevant fragments of the first chunk, wherein the first logical grouping maps to physical storage locations of the first relevant fragments of the first chunk according to first mapping information, and wherein the first chunk comprises at least one non-relevant fragment;
determining, by the system, a second compressed representation of second relevant fragments of a second chunk stored at a second zone of the geographically diverse data storage system, wherein the second chunk is immutable, wherein the second compressed representation is a second logical grouping of the second relevant fragments of the second chunk, wherein the second logical grouping maps to physical storage locations of the second relevant fragments of the second chunk according to second mapping information, and wherein the second zone is a different zone than the first zone; and
generating, by the system, a convolved chunk based on the first compressed representation and the second compressed representation, wherein the convolved chunk is immutable, and wherein the convolved chunk is stored at a third zone of the geographically diverse data storage system that is a different zone than the first zone and is a different zone than the third zone.

13. The method of claim 12, wherein the second chunk comprises at least one non-relevant fragment, and wherein the generating the convolved chunk based on the first compressed representation and the second compressed representation therefore result in the convolved chunk comprising at least one non-relevant fragment.

14. The method of claim 13, further comprising truncating, by the system, the convolved chunk by not storing the at least one non-relevant fragment resulting in a truncated convolved chunk that consumes less storage space than the convolved chunk, wherein the convolved chunk consumes less storage space than consumed by the first and second compressed representations.

15. The method of claim 12, wherein the determining a first compressed representation of first relevant fragments is performed at the first zone of a geographically diverse data storage system.

16. The method of claim 12, wherein the determining a first compressed representation of first relevant fragments is performed at the third zone of a geographically diverse data storage system.

17. The method of claim 12, wherein the first mapping information enables later deconvolution, by the system, of the convolved chunk into a duplicate of the first relevant fragments of the first chunk.

18. A non-transitory machine-readable medium, comprising executable instructions that, when executed by a processor, facilitate performance of operations, comprising:
generating a first compressed representation comprising a first logical representation of first physical storage locations of first relevant fragments of a first chunk stored at a first zone of a geographically diverse data storage system, wherein the first chunk is immutable, wherein the first logical representation maps to the first physical storage locations according to first mapping information, and wherein the first chunk comprises at least one non-relevant fragment;

generating a second compressed representation comprising a second logical representation of second physical storage locations of second relevant fragments of a second chunk stored at a second zone of the geographically diverse data storage system, wherein the second chunk is immutable, wherein the second logical representation maps to the second physical storage locations according to second mapping information, and wherein the second zone is a different zone than the first zone; and generating, by the system, a convolved chunk based on the first compressed representation and the second compressed representation, wherein the convolved chunk is immutable, wherein the convolved chunk is stored at a third zone of the geographically diverse data storage system that is a different zone than the first zone and is a different zone than the third zone, and wherein the first mapping information enables later deconvolution of the convolved chunk into a duplicate of the first relevant fragments according to the first physical storage locations.

19. The non-transitory machine-readable medium of claim 18, wherein the convolved chunk comprises at least one non-relevant fragment.

20. The non-transitory machine-readable medium of claim 18, wherein the convolved chunk is a truncated convolved chunk that consumes less storage space than a full convolved chunk based on the first chunk and the second chunk.

* * * * *